Dec. 25, 1951     B. T. ANDERSON ET AL     2,579,534
FLAP MECHANISM
Filed May 12, 1948     5 Sheets-Sheet 3
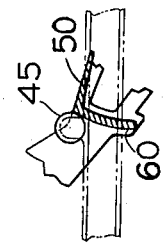
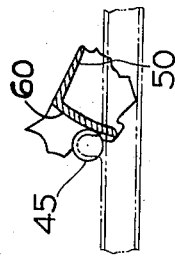
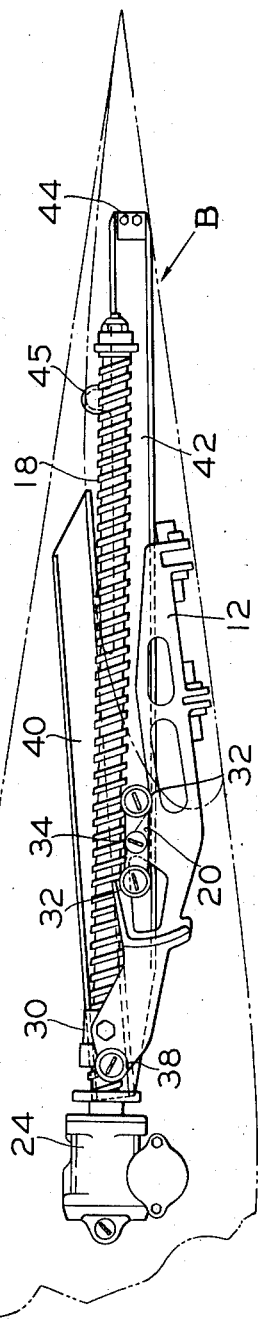
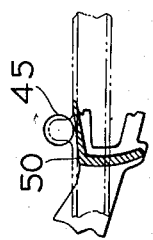
INVENTOR.
BY Benjamin T. Anderson
William A. Welch
ATTORNEY

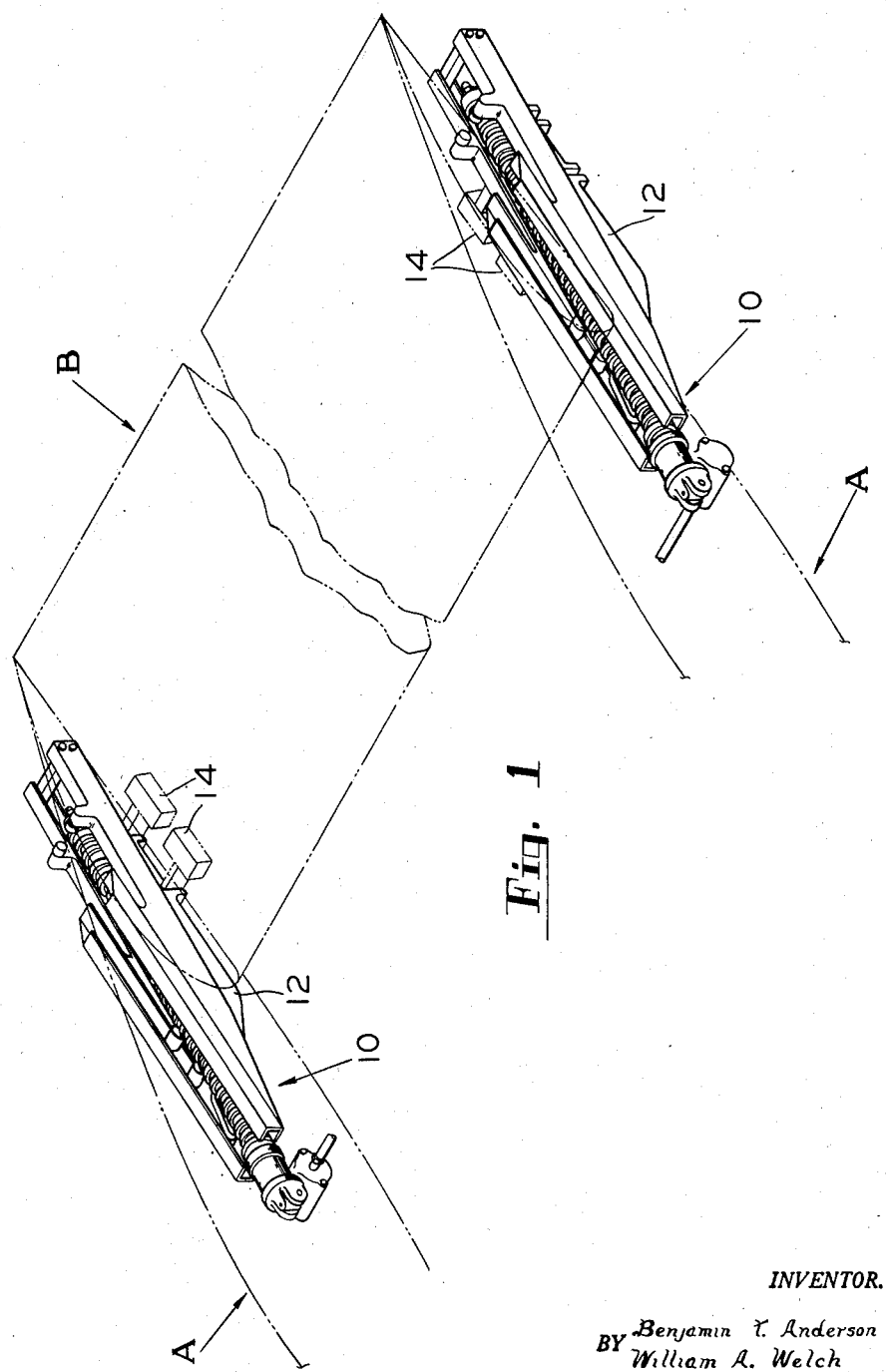

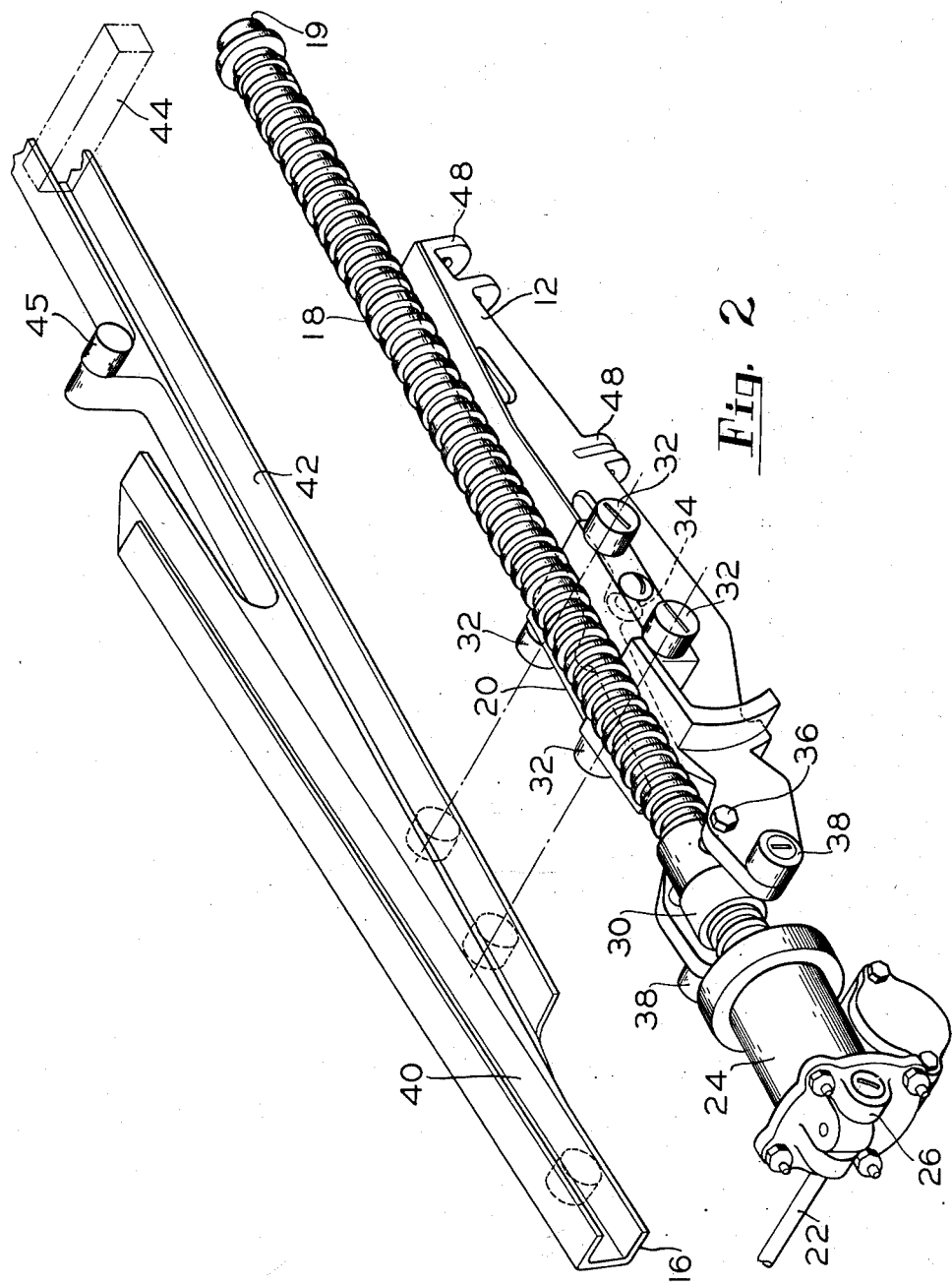

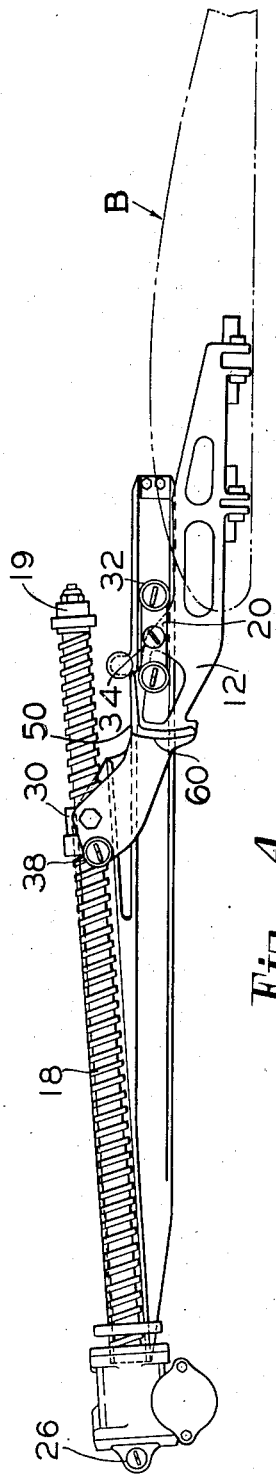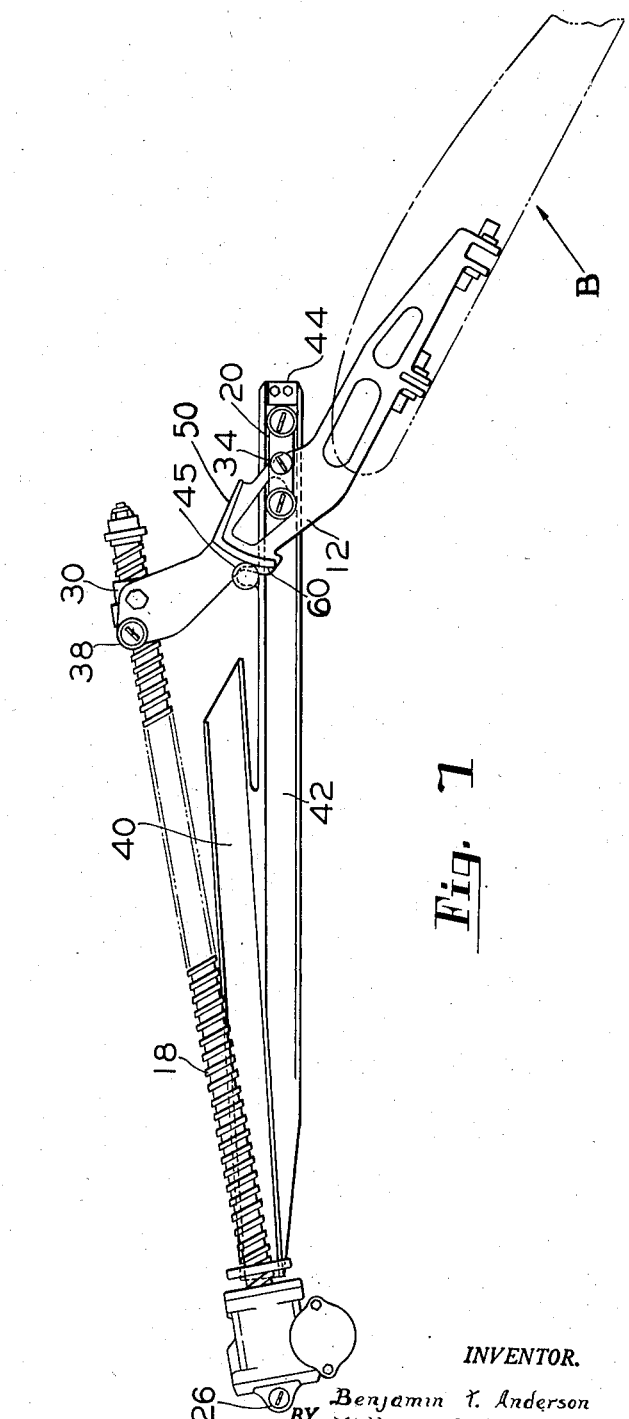

Dec. 25, 1951  B. T. ANDERSON ET AL  2,579,534
FLAP MECHANISM

Filed May 12, 1948  5 Sheets-Sheet 5

INVENTOR.
Benjamin T. Anderson
BY William A. Welch

M. B. Tasker
ATTORNEY

Patented Dec. 25, 1951

2,579,534

UNITED STATES PATENT OFFICE 2,579,534

FLAP MECHANISM

Benjamin T. Anderson, Stratford, and William A. Welch, New Haven, Conn., assignors to United Aircraft Corporation, East Hartford, Conn., a corporation of Delaware Application May 12, 1948, Serial No. 26,578

13 Claims. (Cl. 244—42)

This invention relates to aircraft lift surfaces and especially to improvements in auxiliary airfoils or flaps.

In high performance fighter aircraft it is important that flap operating mechanisms and the like be of simple, dependable, and compact construction in order to increase the efficiency of the aircraft. With the constant reduction in size and the increased loading of high speed wings and aerodynamic surfaces, not only has compactness of auxiliary flap mechanisms increased in importance but also new principles of operation are required in order to adequately reduce takeoff speeds and landing speeds and distances.

Therefore, it is a principal object of this invention to provide an auxiliary airfoil or flap in conjunction with a main aircraft lifting surface for efficiently varying the area, chord and camber of the main lifting surface.

It is another object of this invention to provide an auxiliary airfoil or flap which is controllable through a broad range while still maintaining the streamline of the main airfoil.

Another object of this invention is to provide an aircraft flap mechanism which insures positive control of the flap for any intermediate position in its operative range.

A still further object of this invention is to provide an extensible trailing flap for an aircraft main wing which provides a continuous streamline for the wing upper surface in all positions of extension and is capable of being moved outwardly in the plane of the main wing to increase the area thereof.

A more specific object of this invention is to provide an aircraft flap mechanism which produces an extension of the flap in the plane of the main wing and which can effect a downward rotation of the flap while in its extended position.

A further advantageous feature of this invention resides in the provision of a very simple and dependable mechanism for operating an aircraft flap.

These and other objects of this invention will become apparent from the following detailed description of the drawings wherein:

Fig. 1 is a perspective view of the flap mechanisms installed according to this invention, the trailing portion of the main wing and the flap being shown in phantom;

Fig. 2 is a detailed perspective view of the flap mechanism with one side of the track omitted for clarity;

Fig. 3 is a side elevation of the flap and associated mechanism with the flap shown in the fully retracted position;

Fig. 4 is similar to Fig. 3 but shows the flap in a partially horizontally extended position;

Fig. 5 is a detailed side elevation showing the position of the cam surface on the flap horn just after the flap has passed the Fig. 4 position;

Fig. 6 is a detailed side elevation showing the position of the flap horn cam surface just before the flap has reached the position shown in Fig. 7;

Fig. 7 is a side elevation of the flap and associated mechanism showing the flap in a partially lowered position after having reached maximum horizontal extension;

Fig. 8 is a detailed side elevation showing the position of the flap horn cam surface just before the flap has reached the Fig. 9 position.

Figure 9:
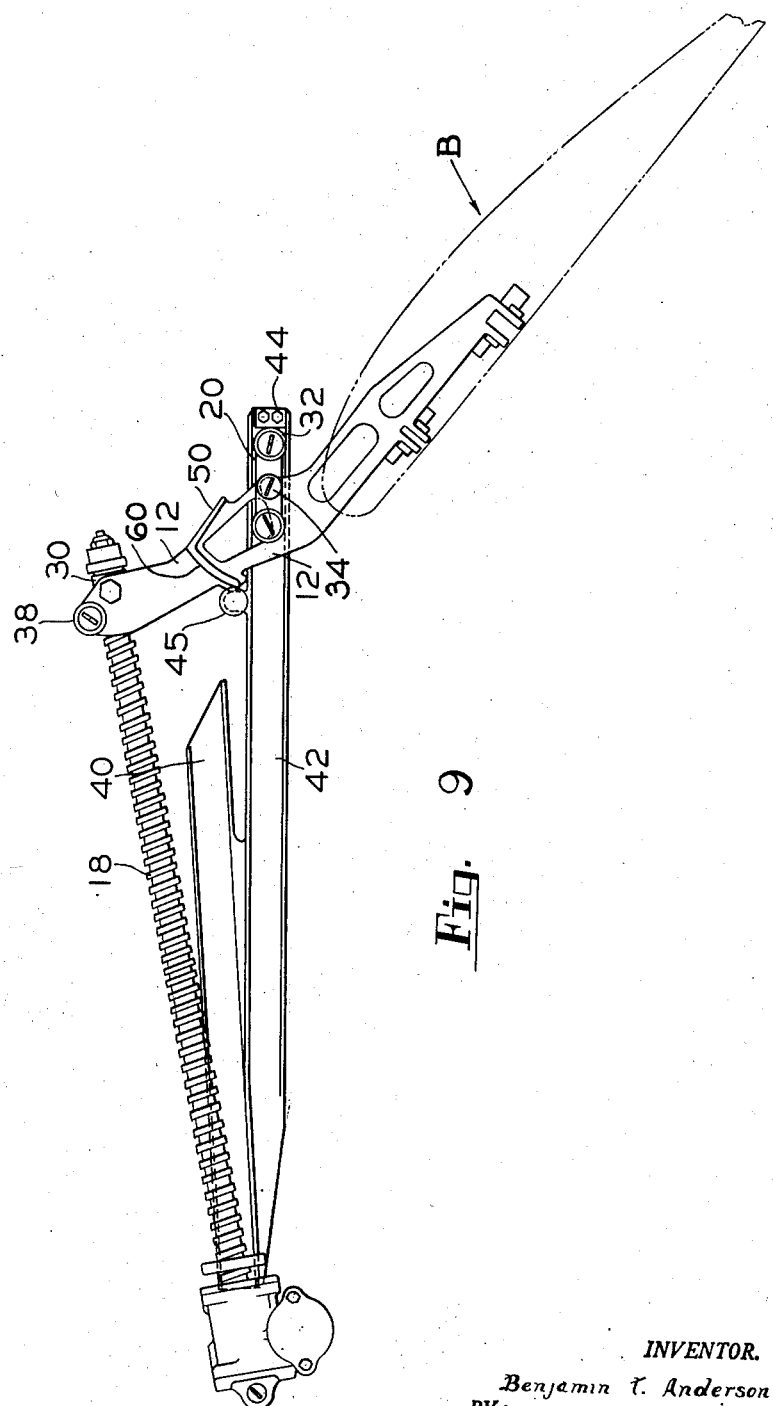
Fig. 9 is similar to Fig. 7 but indicates the fully lowered flap position.

Referring to Fig. 1, a wing trailing portion is generally indicated at A having a fully retracted flap B which forms a continuous streamline surface with the wing A. Identical flap operating mechanisms 10 are attached to the main wing on opposite sides of the flap and each has an operative connection with a flap horn 12. The horns 12 are in turn rigidly mounted to the flap frame on opposite sides of the latter by suitable means generally indicated at 14. Since the mechanisms 10 are identical, except for their right and left characteristics, only one will be referred to in the following description.

As better shown in Fig. 2 each flap operating mechanism comprises a pair of double channeled tracks 16 (only one of which is shown for convenience), an actuating screw 18, and a truck 20. The jack screw 18 is driven by reversible electrical or mechanical power through the drive shaft 22 and the gear box 24. The jack screw 18 and its integral gear box 24 are pivotally mounted to the main wing by means of the mounting pad 26. A drive nut 30 is provided on the jack screw 18 for effecting axial movement along the jack screw 18 upon rotation of the latter. The free end of the screw 18 carries a stop 19 to prevent the drive nut 30 from running off the screw.

The truck 20 carries a plurality of rollers 32 which allow the truck to ride freely within the confronting channels of track 16. In addition, the truck 20 has a central support 34 which provides a pivotal connection with the horn 12. The horn 12 at its forward end has a bifurcated configuration so that it straddles the drive nut 30 and is pivotally attached thereto by suitable means at 36. A pair of rollers 38 are provided at the forward end of the horn 12 on the outside of the bifurcated portion. These rollers 38 communicate with an upper sloping flap guiding channel 40 of the track 16. Similarly the rollers 32 of the truck 20 communicate with the lower flap supporting channel 42 of the track 16.

It should be noted that in lower channel 42 there is provided a stop 44 at its aft end so as to limit the movement of the truck 20. In addition a cam roller 45, whose function will be described later, is mounted on the channel 42 forward of and in spaced relation with the stop 44. The upper channel 40 does not extend as far aft as channel 42 and is open at its aft end so that the rollers 38 will be permitted to leave the channel at a predetermined point in the aft movement of the truck along channel 42.

The flap B is connected to the operating mechanisms 10 by means of the forked fittings 48 (Fig. 2) which are provided in the aft section of the flap horn 12.

Referring now to Fig. 3, it can be seen that the flap B in its fully retracted position forms a streamline continuation of the upper and lower surfaces of the wing A. In this position of the flap the jack screw 18 lies substantially parallel to the chord of the main wing. Also, the drive nut 30 lies in a full forward position on the screw 18 while the adjacent roller 38 on the forward end of the horn 12 is positioned in the forward end of the upper sloping channel 40 and the rollers 32 of the truck 20 are in the extreme forward position in the lower channel 42. As the screw 18 is rotated counterclockwise (Fig. 2) the flap is extended so that when it reaches the position shown in Fig. 4 it lies substantially parallel to the chord of the main wing. The slope of the channel 40 permits the flap to assume this horizontal position inasmuch as it previously had a somewhat negative angle of attack in relation to the chord of the main wing while in the fully retracted position shown in Fig. 3. The amount of negative or positive angle may be varied in order to maintain a streamline position with the wing surfaces while the flap is in the retracted state. Hence the slope of the channels 40 and 42 may be changed in design to meet the requirements of main wing airfoil contour. It should be noted, however, that the channel 40 could be parallel to channel 42 in certain instances since it merely insures that the flap is streamlined with the wing surface during extension and when in the horizontally extended position. In reaching the Fig. 4 position, the cam surface 50 on the horn 12 begins riding under the cam roller 45 previously mentioned while roller 38 is approaching the end of channel 40. The position of the cam surface and the cam roller is shown better in Fig. 5.

Upon further extension, the truck 20 reaches the stop 44 in the lower channel 42 and at the same time the rollers 38 leave the open end of the upper channel 40, thus permitting the free end of the screw 18 and the nut 30 to rise unrestricted while pivoting about the mounting pad connection 26. At the same time that the truck 20 has reached the stop 44 and the rollers 38 begin to leave the channel 40 the cam surface 50 and roller 45 reach the relative positions shown in Fig. 6 wherein the cam roller 45 begins to pass over the arcuate lobe 60 which forms a continuation of the cam surface 50. Since the truck 20 is now prevented from moving aft by stop 44 and is also prevented from moving forward by roller 45, further rotation of the screw 18 will cause the flap horn 12 to rotate about the pivotal connection 34 on the truck 20 thus resulting in downward rotation of the flap.

The flap henceforth can be rotated to its maximum drooping position since lobe 60 of the cam surface 50 assumes the relationship with the cam roller 45 as shown in Fig. 8 to prevent the truck 20 from inadvertently moving forward as a result of sudden reversed aerodynamic loads on the flap.

It is readily apparent that clockwise rotation of the jack screw 18 (Fig. 2) will reverse the operation just described. Thus the drive nut 30 will begin to move forward and the flap will be raised until the lobe 60 on the cam surface 50 has reached the position shown in Fig. 6 in relation to the cam roller 45. The flap will then be substantially parallel to the chord of the main wing and the roller 38 on the forward end of the horn 12 will begin to enter the open end of the sloping channel 40 and the truck 20 will be free to move forward since the cam surface 50 assumes the position shown in Fig. 5.

As a result of this invention it is obvious that an extremely simple mechanism has been provided whereby a flap can be moved through a wide range and also can be positively adjusted to any desired position. In addition, a simple mechanism has been provided which permits relatively horizontal extension of the flap to increase the area of the main wing thereby increasing its lift. At the same time it is possible to increase the drag and reduce the landing speed of an airplane by providing for downward rotation of the flap from its extreme horizontally extended position.

Further as a result of this invention a flap mechanism has been provided which permits high performance aircraft to take off in a short distance by horizontally extending the flap for increased lift without substantially increasing the drag as is normally the case in flaps which rotate downwardly and rearwardly simultaneously. Although downward rotation of the flap increases the camber of the main wing the inherent drag also increases with speed and therefore it is not always desirable to increase the camber during take off. This novel mechanism incorporates all the advantages of ordinary flap mechanisms since in landing or similar flight conditions the flaps can be fully lowered from the horizontally extended position to increase the rate of descent and lower the landing speed.

It is evident that although one embodiment has been shown various changes and modifications can be made without departing from the broad scope of the invention.

We claim:

1. In an airplane, a main wing having a slotted trailing portion, a pair of spaced parallel tracks secured to said wing in a fore and aft position, a screw drive mechanism pivotally mounted on said wing and disposed between said tracks, each track of said pair comprising a lower horizontal supporting channel and an upper sloping guide channel, a truck having rollers engaging said lower supporting channel, a stop carried by said supporting channels to limit aft movement of said truck, a drive nut actuated by said screw drive mechanism, a horn having a pair of ends pivotally connected at a point intermediate said ends to said truck and pivotally connected adjacent one end of said pair of ends to said drive nut, an auxiliary airfoil secured to the other end of said pair of ends, said auxiliary airfoil being extensible horizontally by said drive mechanism, and a guide member mounted on said horn and spaced from said point intermediate said ends and remote from said other end of said pair of ends and engaging said guide channel during said horizontal extension of said auxiliary airfoil, said airfoil pivoting about said point intermediate said ends of said horn when said stop prevents further aft movement of said truck.

2. In an airplane, a wing, a flap mounted on the aft portion of said wing, and a mechanism for operating said flap comprising, a pair of spaced parallel tracks extending fore and aft in said wing, a jack screw drive pivotally attached to said main wing and disposed between said tracks, said horn having one end rigidly attached to said flap and its other end pivotally attached to said drive, a truck movably mounted between said tracks and having a pivot connection with said horn intermediate the ends of the latter, stops on said tracks for limiting the movement of said truck along said tracks, and means for maintaining said truck against said stops during further movement of said drive to rotate said flap including rollers mounted in a fixed position on said tracks and an abutment on said horn for contacting said rollers.

3. In an airplane, a wing, a flap mounted on the aft portion of said wing, and supporting and operating mechanism for moving said flap aft relative to said wing and, when in its most remote position relative to said wing, for pivoting said flap downwardly including, track means extending fore and aft in said wing having a lower flap supporting and an upper flap guiding track, the upper guiding track having its aft end terminated short of the aft end of the lower supporting track, mounting means for said flap having supporting and guiding elements cooperating respectively with said supporting and guiding tracks, said supporting element having a pivotal connection with said flap mounting means, stop means for arresting the aft movement of said mounting means with said supporting element in said supporting track and said guiding element free from said guiding track, and operating means having a connection with fixed structure of said airplane and with said mounting means for moving said mounting means aft along said supporting track against said stop means and thereafter for pivoting said flap about the pivot of said supporting element.

4. In an airplane, a wing, a flap mounted on the aft portion of said wing, and supporting and operating mechanism for moving said flap aft relative to said wing and, when in its most remote position relative to said wing, for pivoting said flap downwardly including, track means extending fore and aft in said wing having a lower flap supporting track and an upper flap guiding track, the upper guiding track having its aft end terminated short of the aft end of the lower supporting track, mounting means for said flap having supporting and guiding elements cooperating respectively with said supporting and guiding tracks, said supporting element having a pivotal connection with said flap mounting means, stop means for arresting the aft movement of said mounting means with said supporting element in said supporting track and said guiding element free from said guiding track, operating means having a connection with fixed structure of said airplane and with said mounting means for moving said mounting means aft along said track means against said stop means and thereafter for pivoting said flap about said supporting element, and cooperating abutment means on said mounting means and said track means, the abutment means on said mounting means having an arcuate abutment face struck about the pivot of said supporting element, for locking said mounting means against forward movement along said track means during the pivoting of said flap about said supporting element.

5. In an airplane, a wing, a flap mounted on the trailing portion of said wing having a forwardly extending horn, fixed track means extended fore and aft on said wing including a lower flap supporting track and an upper flap guiding track, a truck movable along said supporting track having a pivotal connection with said horn intermediate the ends of the latter, guiding means carried by said horn adjacent its forward end and movable along said guiding track, stop means for arresting the movement of said truck at the aft end of said supporting track, said guiding track being shorter than said supporting track whereby as said truck reaches its aftmost position said guiding means moves free from said guiding track, flap control means having an operative connection with the forward end of said horn, and cooperating abutment means carried by said track means and said horn for locking said truck against forward movement on said supporting track when said horn is moved about said pivotal connection by said control means.

6. In an airplane, a wing, a flap mounted on the trailing portion of said wing, fixed track means extending fore and aft in said wing for supporting said flap for fore and aft movement and for pivotal movement relative to said wing, said track means including a lower flap supporting track and an upper flap guiding track, said guiding track having its aft end terminated short of the aft end of said supporting track, a truck movable on said supporting track, a forwardly extended horn on said flap having a pivotal support on said truck and having guiding means movable along said guiding track, stop means at the aft end of said supporting track for arresting said truck in a position in which said guiding means has run off the aft end of said guiding track, and cooperating abutment means on said track means and on said horn engageable as said guiding means leaves said guiding track for holding said truck against forward movement on said supporting track.

7. In an airplane, a wing, a flap mounted on the trailing portion of said wing, track means extending fore and aft in said wing for supporting said flap for fore and aft movement and for pivotal movement relative to said wing, said track means including a lower flap supporting track and an upper flap guiding track, said guiding track having its aft end terminated short of the aft end of said supporting track, a truck movable on said supporting track, a forwardly extended horn on said flap having a pivotal support on said truck and having guiding means movable along said guiding track, stop means at the aft end of said supporting track for arresting said truck in a position in which said guiding means has run off the aft end of said guiding track, and cooperating stationary and relatively movable abutment means on said track means and horn respectively, engageable as said guiding means leaves said guiding track, for holding said truck against said stop means, and relatively movable abutment means having an arcuate abutment face struck about the pivotal support for said horn.

8. In an airplane, a wing, a flap operatively connected to the trailing portion of said wing, a track extending fore and aft in said wing, a truck slidable in said track, a flap supporting member pivoted intermediate its ends on said truck, means for attaching said flap to said member, means operatively connected with said member for sliding said truck aft on said track and subsequently rotating said member about its pivot, and means for holding said truck stationary during the pivotal movement of said member including a stop in said track for arresting the aft movement of said truck, and cooperative abutment means for holding said truck against forward movement on said track including an abutment member on said pivoted member having an arcuate face, and a cooperating abutment member carried by a fixed part of the airplane.

9. In an airplane, a wing, a flap operatively connected to the trailing portion of said wing, a bifurcated track extending fore and aft in said wing, a truck slidable in the lower furcation of said track, a flap supporting member pivoted intermediate its ends on said truck, flap mounting means for attaching said flap to one end of said member, means for extending said flap aft in substantially the plane of said wing, a guide on the other end of said member slidable along and out the aft end of the upper furcation of said track, and means for rotating said member about its pivotal support after said guide slides out of said upper track furcation whereby said flap is rotated downwardly about its pivot including a stop in the aft portion of said lower track furcation engageable by said truck.

10. In an airplane, a wing, a flap operatively connected to the trailing portion of said wing, upper and lower tracks extending fore and aft in said wing, said upper track having an open aft end, a truck slidable in said lower track, an elongated member pivoted intermediate its ends on said truck having means for attaching one of its ends to said flap, a guide on the other end of said member slidable along and out the aft end of said upper track, operating means connected to said member for moving said truck aft along said lower track to extend said flap aft from the trailing portion of said wing, stop means in the aft portion of said lower track for arresting the aft movement of said truck and cooperating with said operating means to rotate said member about its pivot for deflecting said flap downwardly when said guide means moves out of the aft end of said upper track, and means for locking said truck against forward movement along its track during such rotational movement of said member including an arcuate abutment on said member and a cooperating abutment on a fixed part of the airplane.

11. In an aircraft, a wing, a trailing edge flap including a forwardly extending horn for said flap, upper and lower tracks extending fore and aft in said wing, a truck movable in one of said tracks, means for pivotally mounting said horn on said truck, flap actuating means operatively connected to the forward end of said horn, cam means adjacent the forward end of said horn slidable along the other of said tracks to control horizontal flap extension, means operative when said cam means has reached the end of its track for immobilizing said truck and effecting movement of said horn about its pivot including a first stop engageable by said truck near the aft end of its track and a second stop on said horn intermediate the horn pivot and said cam means and a cooperating abutment member carried by a fixed part of the airplane and engageable with said second stop.

12. In combination with an airplane wing and an extensible airfoil normally housed therein in retracted position: a pair of spaced parallel tracks secured to said wing, each of said tracks comprising a lower and rearwardly extending supporting channel and an upwardly and rearwardly extending guide channel having an open rear end, a pair of trucks, one of said trucks being movably mounted in one of said lower supporting channels and the other of said trucks being movably mounted in the other of said lower supporting channels; a pair of horns, each of said horns having a pair of ends and being pivotally secured at a point intermediate said ends to its associated truck, said extensible airfoil being secured between said horns and to one end of each of said horns; means for moving said trucks along said supporting channels pivotally secured to the other end of each of said horns; a guide member on each of said horns spaced from said point intermediate said ends and remote from said one end of said pair of ends and engaging its respective guide channel; and a stop in each of said supporting channels to limit rearward movement of said trucks, said airfoil pivoting about the axis of said points intermediate said ends of said horns when said stops prevent further rearward movement of said trucks.

13. In the device of claim 12, a cam on each of said horns intermediate said other end of said pair of ends and said point intermediate said ends, and a member secured to each of said supporting channels and cooperating with said cam for preventing forward movement of said trucks when said guide members are not engaged in said guide channels.

BENJAMIN T. ANDERSON.
WILLIAM A. WELCH.

REFERENCES CITED

The following references are of record in the file of this patent:

UNITED STATES PATENTS

| Number | Name | Date |
|---|---|---|
| 2,137,382 | Blaylock et al. | Nov. 22, 1938 |
| 2,348,150 | Richter | May 2, 1944 |
| 2,426,785 | Naumann | Sept. 2, 1947 |